Inventors
Frank Carlton
Leonard L. Snyder

By Lyon & Lyon
Attorneys

Patented June 17, 1952

2,600,731

UNITED STATES PATENT OFFICE 2,600,731

VACUUM BREAKER

Frank Carlton, Los Angeles, and Leonard L. Snyder, Montebello, Calif.

Application April 25, 1944, Serial No. 532,576

10 Claims. (Cl. 137—69)

This invention relates to vacuum breakers, and more particularly to a vacuum breaker adapted for use in a flow line to vent the line to the atmosphere in the event of the development of a vacuum or condition of reduced pressure whereby back flow or back siphonage would result. The vacuum breaker in this case is normally under pressure, as distinguished from the vacuum breaker for a plumbing fixture, and which is under pressure for short and infrequent intervals only.

An object of this invention is to provide a vacuum breaker adapted to be mounted in a liquid flow line and which is adapted to vent the flow line to the atmosphere when the pressure in the system drops below atmospheric pressure and which vacuum pressure includes a flexible diaphragm operable to actuate the vent valve to an open position and wherein means are provided to permit the atmospheric pressure to be effective over a relatively large diameter of the diaphragm compared with the seat diameter of the valve.

Another object of this invention is to provide a vacuum breaker which is adapted to be mounted in a fluid supply system and which is operable to vent the system to the atmosphere when the pressure of the system drops below atmospheric pressure and which vacuum breaker provides a valve member normally seated during normal flow through the system and with which valve member there is associated a flexible diaphragm which has a relatively large area responsive to atmospheric pressure as compared with the seat diameter of the valve, and a means which supports the flexible diaphragm during normal flow but permits the atmospheric pressure to be effective over the said area of support.

Ordinarily, when a flexible diaphragm material is used, such as cloth impregnated with rubber, the diaphragm will adhere to the metal backing or support, and will require considerable force to overcome this adhesion. Hence, in a vacuum breaker, the effectiveness of the diaphragm for pulling the vacuum breaker seat from the sealing ring is greatly reduced for two reasons: First, a considerable force is required to overcome the adhesion itself; and second, the adhesion prevents air from reaching the outer surface of the diaphragm and thereby becoming effective in pulling the vacuum breaker seat from the sealing ring. The diaphragm supporting means mentioned above will not adhere to the diaphragm, and therefore atmospheric pressure is immediately in contact with the entire diaphragm surface.

Other objects and advantages of this invention it is believed will be apparent from the following detailed description of a preferred embodiment thereof as illustrated in the accompanying drawings.

Figure 1:
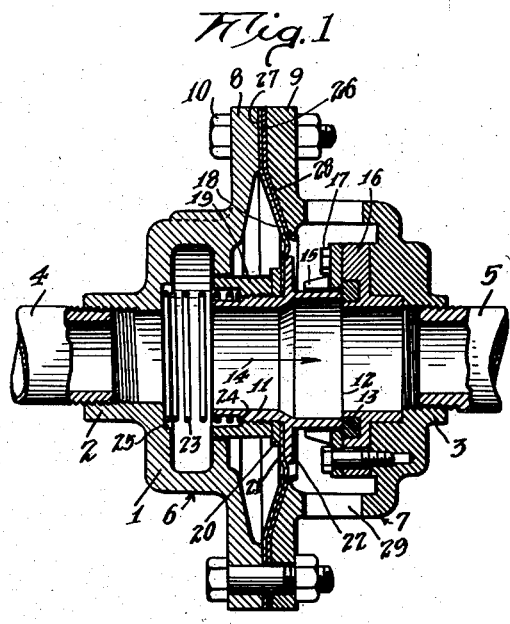
Figure 1 is a sectional elevation of the vacuum breaker embodying our invention illustrating the same in closed position.

In the preferred embodiment of our invention illustrated in the accompanying drawings, 1 indicates a chamber member or casing having an inlet branch 2 and an outlet branch 3 for connection with inlet and outlet pipes 4 and 5, respectively.

The casing 1 is formed of two sections 6 and 7 which are secured together at companion annular flanges 8 and 9 by means of a plurality of securing bolts 10. A valve sleeve 11 is positioned axially of the casing 1 and has formed at its end a valve face 12 adapted to seat upon the ring 13 to confine the flow of fluid through the casing 1 to the axial flow as indicated by the arrow 14. The valve sleeve 11 is guided in its movement toward and away from the ring 13 by means of a guide member 15. The guide member 15 is formed as a guide ring and is secured to the seat mounting ring 16 which is in turn secured within the casing 1 by means of a plurality of bolts 17. Means are provided for securing the valve sleeve 11 to the differential pressure diaphragm 18, which means are herein illustrated as including a sleeve follower 19 which is threaded to the sleeve 11 in position to force the clamp ring 20 against the inner edge of the diaphragm 18 to thereby clamp the same upon the shoulder 21 provided by the annular flange 22 of the valve sleeve 11.

The valve sleeve 11 is normally urged toward the seat ring 13 by means of a spring 23 which is engaged at one end upon the shoulder 24 of the valve sleeve 11 and is engaged at its opposite end upon the shoulder 25 of the casing 1.

In the preferred form illustrated, the diaphragm 18 at its outer edge is positioned between the flanges 8 and 9 and is backed by a porous ring 26. The diaphragm is secured to the surface 27 of the flange 8 and is shaped normally to extend parallel with the inclined wall 28 of the flange 9. The porous backing disc 26 may be of any suitable material to which the diaphragm will not adhere, such as a porous fabric, felt, or other material which will permit pressure from the exterior of the casing 1 as it passes through the apertures 29 to exert its pressure on the outer side of the diaphragm 18 through the pores of the backing material so that the surface of the diaphragm beyond the companion flanges 8 and 9 and to the supporting ring 22 is subject to atmospheric pressure acting in a direction to move the valve sleeve 11 away from the seat 13.

It is preferable that the porous backing disc 26 be of a non-adhesive character so that it will not adhere to the diaphragm 18, whereby on flexing of the diaphragm the pressure becomes immediately effective over the area of the diaphragm without the necessity of overcoming the resistance due to adhesion.

It will be observed that with the vacuum breaker closed as illustrated in Figure 1 that only a relatively small area of the flexible diaphragm is unsupported. It will be further observed that the inclined wall 28 of the flange 9 engaging the porous backing 26 supports the diaphragm over the major portion of its area even though the diaphragm 18 is flexed to a position to move the sleeve 11 against its seat 13.

Figure 2:
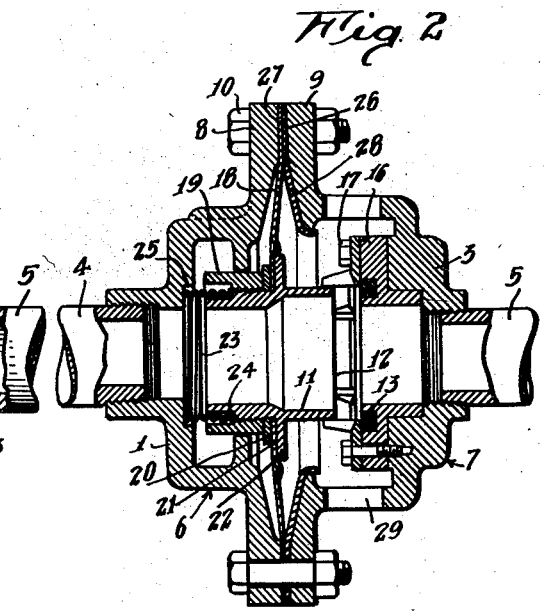
Figure 2 is a section similar to Figure 1 illustrating the parts in open position.

In Figure 2 we have illustrated the vacuum breaker in open position where the atmospheric pressure has operated against this large effective area of the flexible diaphragm 18 to move the valve sleeve 11 away from the seat 13, thereby venting the system to the atmosphere.

Figure 3:
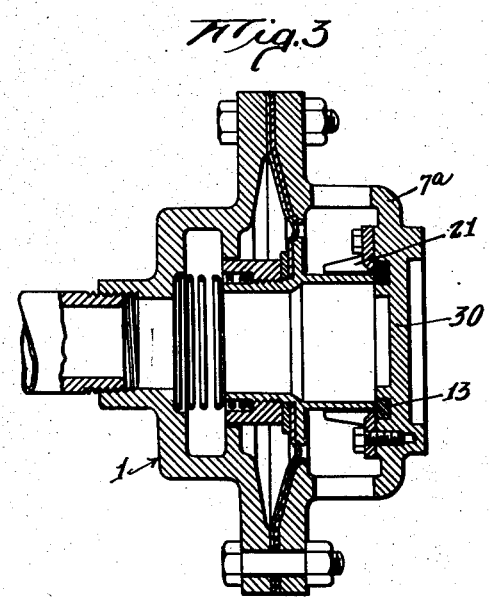
Figure 3 is a sectional elevation of a modified form of vacuum breaker illustrating the same as employed as an atmospheric break as distinguished from the position within a flow line as in the modification illustrated in Figures 1 and 2.

In the modified form of our invention illustrated in Figure 3, we have indicated the vacuum breaker of our invention as utilized for relieving a vacuum which may be developed in any flow system or similar use but where the fluid does not flow directly through the case 1.

In this modification of our invention the portion 7ª of the case 1 is formed with a solid enclosing end 30. In this case the seat ring 13 is carried directly by the solid end 30 and the guide 21 acts as the retainer to hold the seat ring 13 in the recess formed in the end 30. In other respects this modification is the same as that set forth in Figures 1 and 2.

This application is a continuation in part of our co-pending application, Serial No. 491,842, filed June 22, 1943, for Back Siphonage Prevention, Anti-back Flow and Vacuum Breaking Valve and Method of Operation, now Patent No. 2,491,604 of December 20, 1949.

We have herein set forth our invention in its preferred form but it is to be understood that our invention is not limited to the details of construction as herein set forth, but is of the full scope of the appended claims.

We claim:

1. In a vacuum breaker, the combination of a case having an inlet branch for the admission of fluid under pressure, the case having a vent outlet, a sleeve valve member mounted axially of the case, a seat for the valve member, the valve member being adapted when seated to normally confine flow through the case, a flexible diaphragm to which the sleeve valve member is axially secured, the flexible diaphragm being secured to the case at its outer edge to provide one surface open to the pressure of the fluid within the case and its opposite surface exposed to the pressure of the atmosphere within the case as exerted through said vent outlet, means for supporting the flexible diaphragm within the case when the diaphragm is flexed to seat the sleeve valve member, said means including a porous fabric-like backing element interposed between the diaphragm and the case and permitting atmospheric pressure to be exerted over the area of the diaphragm between the sleeve and the case.

2. In a vacuum breaker, the combination of a case having an inlet and an outlet branch defining a path of flow of fluid therethrough, the case having a vent outlet, an axially movable sleeve valve member normally seated within the case and acting to confine flow between the inlet and outlet, a flexible diaphragm member connected with the sleeve valve member and the case and providing surfaces one of which is exposed to the pressure of the fluid within the case and the other of which is exposed to atmospheric pressure acting through the vent, and means for supporting the diaphragm within the case with the greater portion of its area exposed to atmospheric pressure when the diaphragm is flexed under the fluid pressure within the case to move the sleeve valve against its seat, said supporting means including a porous flexible member interposed between the diaphragm and the casing, the member permitting atmospheric pressure to be exerted against said supported surface when a condition of sub-atmospheric pressure arises within the case to quickly move the sleeve valve to position to vent the case, the porous member being interposed between the diaphragm and the case.

3. In a vacuum breaker, the combination of a case having an inlet for fluid under pressure, a valve member, a seat for the valve member within the case, the case having a vent outlet normally closed by the valve, a diaphragm secured to the valve and to the case whereby the inner surface of the diaphragm is exposed to the pressure of the fluid within the case and the outer surface of the diaphragm is exposed to atmospheric pressure acting through the vent, and a flexible disc of porous material positioned between the diaphragm and the case along the outer surface whereby the atmospheric pressure acting through the vent may act upon the surface of the diaphragm through the porous disc.

4. A vacuum breaker structure including a case having an inlet passage, a cylindrical tubular valve element disposed centrally of the case, a valve seat within the case against which the tubular valve may seat, a chamber circumscribing the valve element and communicating with the atmosphere, an annular chamber circumscribing the valve element within the case, a flexible diaphragm separating the annular chamber into the two chambers and through the center of which diaphragm the valve element extends and is secured, one surface of the diaphragm being exposed to atmospheric pressure, a porous mounting for the exposed surface of the diaphragm whereby atmospheric pressure is exerted over its exposed surface, said porous mounting including a flexible fabric-like element interposed between the diaphragm and a portion of the case.

5. In combination with an inlet and an outlet pipe, of a casing providing a passage therebetween, a valve in said passage communicating with the atmosphere, a circumscribing chamber around the passage and communicating therewith defined by a rigid wall on one side and a diaphragm on the opposite side, said diaphragm being subject to the pressure of the fluid on one side and atmospheric pressure on the opposite side, an operative connection between said diaphragm and the valve whereby the valve will open when the pressure in the case is reduced below atmospheric pressure, means for securing the diaphragm to the case, one surface of the diaphragm subject to fluid pressure within the case, the opposite surface of the diaphragm being subject to atmospheric pressure, a flexible porous element contacting the opposite surface of the diaphragm and a portion of the case when the diaphragm is flexed to seat the valve, whereby atmospheric pressure will act against the latter said surface.

6. In a vacuum breaker, the combination of a case having an inlet for fluid under pressure, a valve member, a seat for the valve member within the case, the case having a vent opening normally closed by the valve, a diaphragm secured to the valve and to the case, the valve member when closed providing a passage through the case for fluid to pass from the inlet thereof to an outlet and providing a chamber wherein the fluid under pressure passing through the casing acts upon the diaphragm to hold the valve against the seat in opposition to atmospheric pressure acting upon the opposite side of the diaphragm through the vent, the case providing a support for the diaphragm when the same is flexed under the pressure of the fluid and the valve is moved to vent-closing position, and a flexible member of porous material positioned between the diaphragm and the support to permit the pressure of the atmosphere to be exerted over the surface of the diaphragm within the case.

7. In a vacuum breaker, the combination of a case having an inlet for fluid under pressure and an outlet, a cylindrical valve member positioned within the case and providing a passage therethrough between the inlet and the outlet, a diaphragm within the case dividing the case into a fluid pressure chamber and an atmospheric pressure chamber, a valve seat within the case in the atmospheric chamber of the case against which the valve member is adapted to be seated under the pressure of the fluid passing from the case inlet to the case outlet and acting in the fluid pressure chamber against the diaphragm, the atmospheric chamber of the case being normally open to the atmosphere and the case providing in the atmospheric chamber thereof a diaphragm support upon which the diaphragm is supported when flexed under the pressure of the fluid passing through the case from the inlet to the outlet, and a flexible member of porous material positioned between the diaphragm and the support and against which the diaphragm is seated whereby the pressure of the atmosphere may be exerted over the surface of the diaphragm within the atmospheric chamber of the case.

8. In a vacuum breaker, the combination of a case having an inlet for fluid under pressure, a valve member, a seat for the valve member within the case, the case having a vent opening normally closed by the valve, a diaphragm secured to the valve and to the case, the valve member when closed providing a passage through the case for fluid to pass from the inlet thereof to an outlet and providing a chamber wherein the fluid under pressure passing through the casing acts upon one side of the diaphragm to hold the valve against the seat in opposition to atmospheric pressure acting upon the opposite side of the diaphragm through the vent, the case providing a rigid annular imperforate support for the diaphragm when the diaphragm is flexed under the pressure of the fluid and the valve is moved to vent-closing position, and a porous element of fabric-like material interposed between the rigid annular support and the diaphragm, the element having a portion thereof exposed to the atmosphere to permit atmospheric pressure to be exerted upon said opposite side of the diaphragm adjacent the rigid annular support.

9. In a vacuum breaker, the combination of a case having an inlet for fluid under pressure, a valve member, a seat for the valve member within the case, the case having a vent opening normally closed by the valve, a diaphragm secured to the valve and to the case, the valve member when closed providing a passage through the case for fluid to pass from the inlet thereof to an outlet and providing a chamber wherein the fluid under pressure passing through the casing acts upon one side of the diaphragm to hold the valve against the seat in opposition to atmospheric pressure acting upon the opposite side of the diaphragm through the vent, the case providing a rigid annular imperforate support for the diaphragm when the diaphragm is flexed under the pressure of the fluid and the valve is moved to vent-closing position, and an annular porous element of fabric-like material interposed between the rigid annular support and the diaphragm, the element having the inner portion thereof exposed to the atmosphere to permit atmospheric pressure to be exerted upon said opposite side of the diaphragm adjacent the rigid annular support.

10. In a vacuum breaker, the combination of a case having an inlet for fluid under pressure, a valve member, a seat for the valve member within the case, a diaphragm secured to the valve and to the case, the case providing a rigid annular imperforate support for the diaphragm when the diaphragm is flexed under the pressure of the fluid and the valve is moved to seat contacting position, and an element of fabric-like material interposed between the rigid support and the diaphragm, said fabric-like material being of non-adhesive character, the element having the inner portion thereof exposed to the atmosphere to permit atmospheric pressure to be exerted over the area of the diaphragm adjacent the rigid support.

FRANK CARLTON.
LEONARD L. SNYDER.

REFERENCES CITED

The following references are of record in the file of this patent:

UNITED STATES PATENTS

| Number | Name | Date |
| --- | --- | --- |
| 1,269,721 | Kuntny | June 18, 1918 |
| 1,851,062 | Protzer | Mar. 29, 1932 |
| 2,060,567 | Glenk | Nov. 10, 1936 |
| 2,117,389 | Yoder | May 17, 1938 |